United States Patent [19]

Paradise et al.

[11] Patent Number: 4,947,345
[45] Date of Patent: Aug. 7, 1990

[54] QUEUE MANAGEMENT SYSTEM FOR A MULTI-FUNCTION COPIER, PRINTER, AND FACSIMILE MACHINE

[75] Inventors: Elizabeth M. Paradise, Pittsford; Edwin R. Monkelbaan, Fairport, both of N.Y.

[73] Assignee: Xerox Corporation, Stamford, Conn.

[21] Appl. No.: 384,628

[22] Filed: Jul. 25, 1989

[51] Int. Cl.⁵ .............................................. G06F 15/00
[52] U.S. Cl. .................... 364/519; 364/242.2; 358/442
[58] Field of Search .......................... 364/519–520, 364/242.2 MS; 358/408, 442; 355/314, 313

[56] References Cited

U.S. PATENT DOCUMENTS 4,466,065 8/1984 Advani et al. ...................... 364/200
4,829,468 5/1989 Nonaka et al. ...................... 364/900

*Primary Examiner*—Arthur G. Evans
*Attorney, Agent, or Firm*—Frederick E. McMullen

[57] ABSTRACT

A multi-mode machine having copying, printing, and facsimile transmission and reception modes for processing copy, print, and facsimile jobs, with a queue management process for ordering printing of the jobs in a strict FIFO order or in a modified FIFO order in which printing of the facsimile jobs is deferred, with the deferred facsimile jobs having printing priority over any copy and print jobs to be printed.

9 Claims, 11 Drawing Sheets

QUEUE MANAGEMENT SYSTEM FOR A MULTI-FUNCTION COPIER, PRINTER, AND FACSIMILE MACHINE

BACKGROUND OF THE INVENTION

The present invention relates to multi-function copier, printer, and facsimile machines, and more particularly, to a queue management system for ordering the copy, print, and facsimile outputs of multi-function machines.

Historically, copiers, printers, and facsimile or fax machines have been typically individualistic, operating singly in their own separate environments. Thus, copiers have functioned exclusively for the purpose of making copies of documents. And, while with the passage of time, the speed and functionality of copiers have been improved, and aids such as automatic document handlers, stackers, staplers, etc. provided, the basic function of a copier remained the same, that is, to make copies. Similarly, to answer the need to transmit and receive copies between distant locations, the fax machine was developed. However, like the copier, the function of the fax machine was singular, that is, to transmit and receive documents only. And although fax machines have been greatly enhanced over the years to a point where now fax machines operate unattended and at relatively high transmission speeds, the fax machine still serves a single function, i.e., to transmit and receive copies. More recently, electronic printers have appeared. These machines generate prints from video image signals representing the image to be printed. And, while electronic printers have been and are being improved to provide better resolution and higher speeds, the function of the printer has remained the same, that is, to produce prints in the fastest, most expeditious, and inexpensive way possible.

For the future, multi-functional machines which combine in one machine copy, print and fax functions are expected to take the place of the multitude of separate and single purpose machines of today. While multi-function machines will tend to reduce the number of separate and single function machines in the marketplace today, these multi-function machines, in order to operate efficiently, will require priority and ordering of the diverse copy, print and fax functions of which they are capable. This is particularly important where the machine is able to carry out more than one function at a time.

SUMMARY OF THE INVENTION

The present invention provides a queue management process for a multi-mode machine having copying, printing, and facsimile transmission and reception modes for processing copy, print, and facsimile jobs, the machine including a printer for making prints in response to a demand for copies, prints, and prints of facsimile transmissions; a job printing queue, and a job holding queue, comprising the steps of: in one machine mode, inserting all copy, print, and facsimile jobs in the printing queue with the jobs being arranged for printing by the printer in the printing queue in the order in which the jobs are received; and in a second operating mode inserting all copy and print jobs in the printing queue with the jobs being arranged for printing by the printer in the printing queue in the order in which the jobs are received; inserting all facsimile jobs not to be printed in the job holding queue with the facsimile jobs being arranged in the holding queue in the ordr in which the facsimile jobs are received; transferring at least one of the facsimile jobs from the holding queue to the printing queue; interrupting the printing order of any of the copy and print jobs currently in the printing wueue and placing the one facsimile job transferred from the job holding queue ahead of any of the copy and print jobs in the printing queue whereby the one facsimile job is printed first; and following printing of the one facsimile job, resuming printing of the next one of the copy and print jobs remaining in the printing queue.

BRIEF DESCRIPTION OF THE DRAWINGS

Other features of the present invention will become apparent as the following description proceeds and upon reference to the drawings in which.

DESCRIPTION OF THE PREFERRED EMBODIMENT

Figure 1:
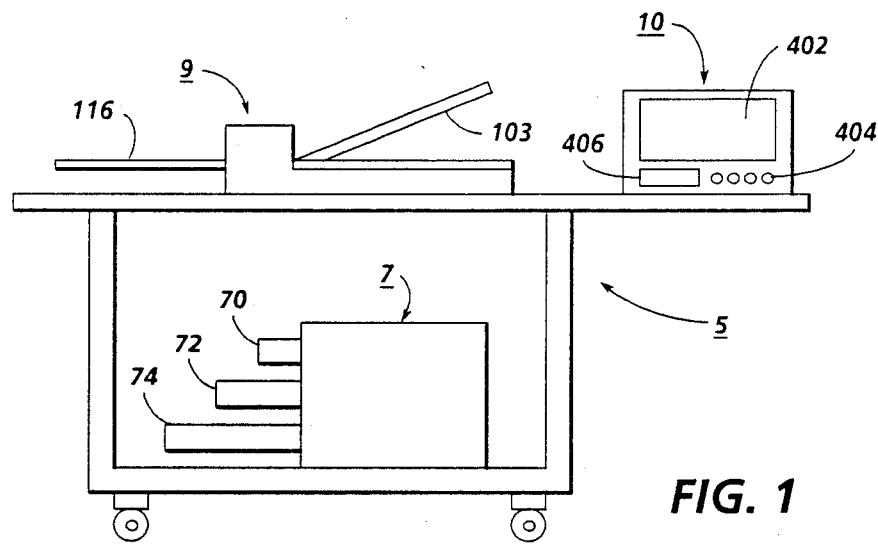
FIG. 1 is a view showing the principal components of a multi-function copier, printer, and facsimile machine of the type adapted to utilize the queue management system of the present invention.
Figure 4:
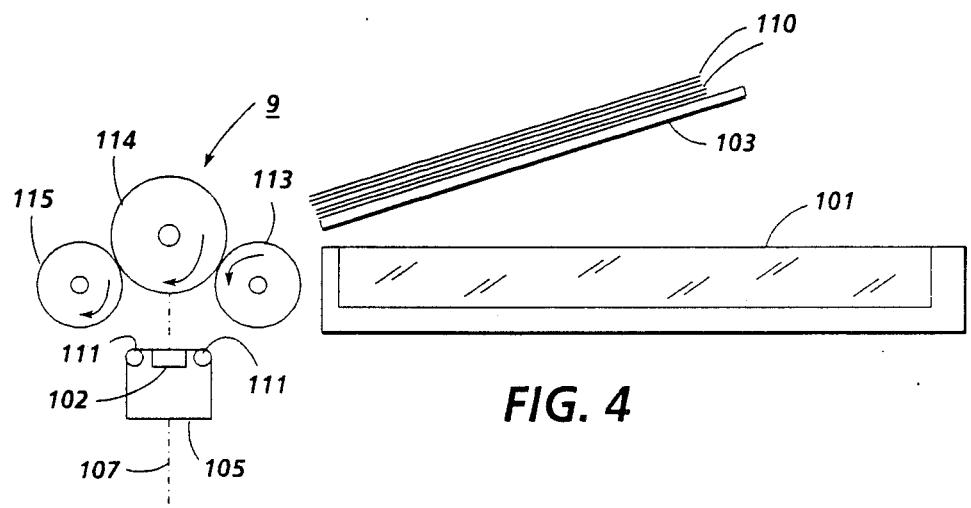
FIG. 4 is a more detailed view of the document input scanner for the machine shown in FIG. 1.
Figure 2:
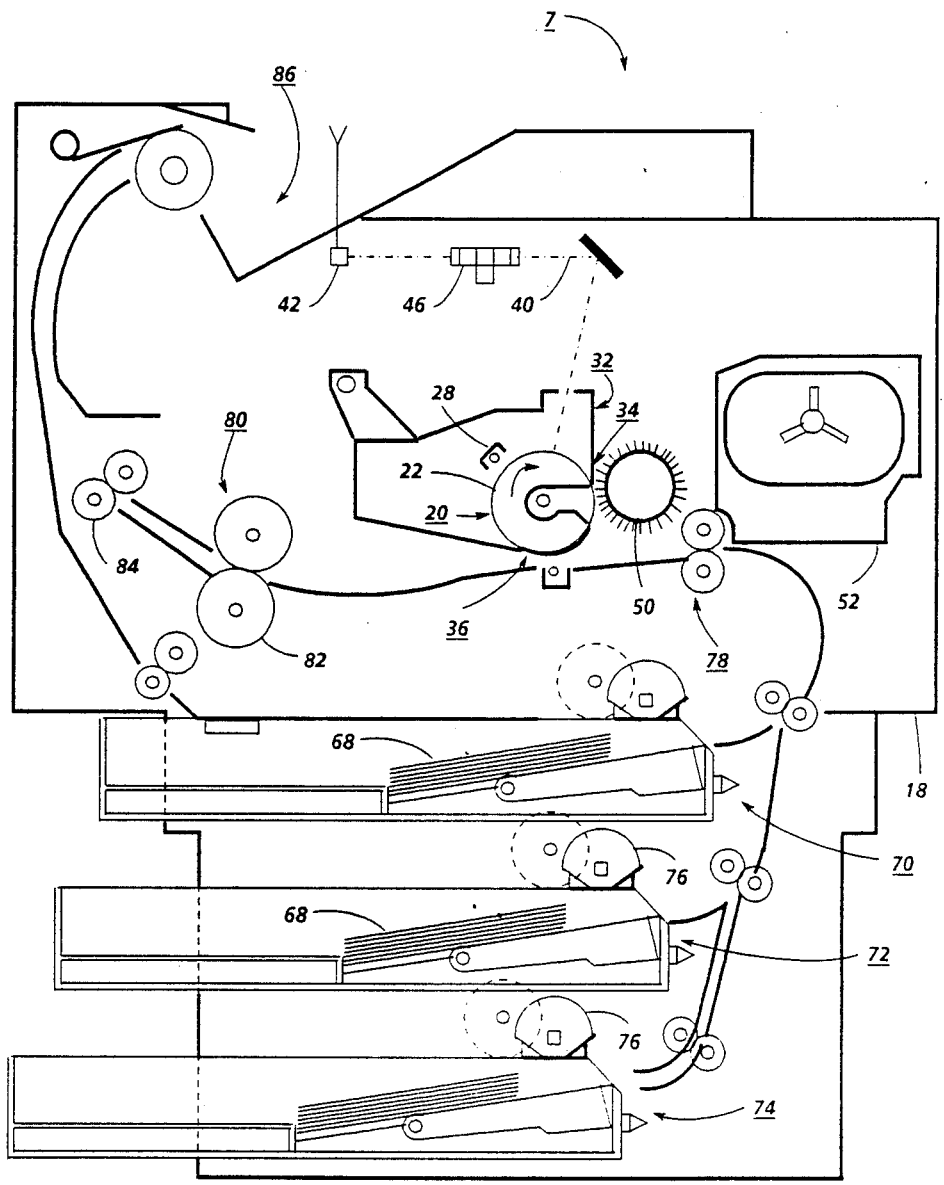
FIG. 2 is a view in cross section showing details of the laser printer for the machine shown in FIG. 1.
Figure 3:
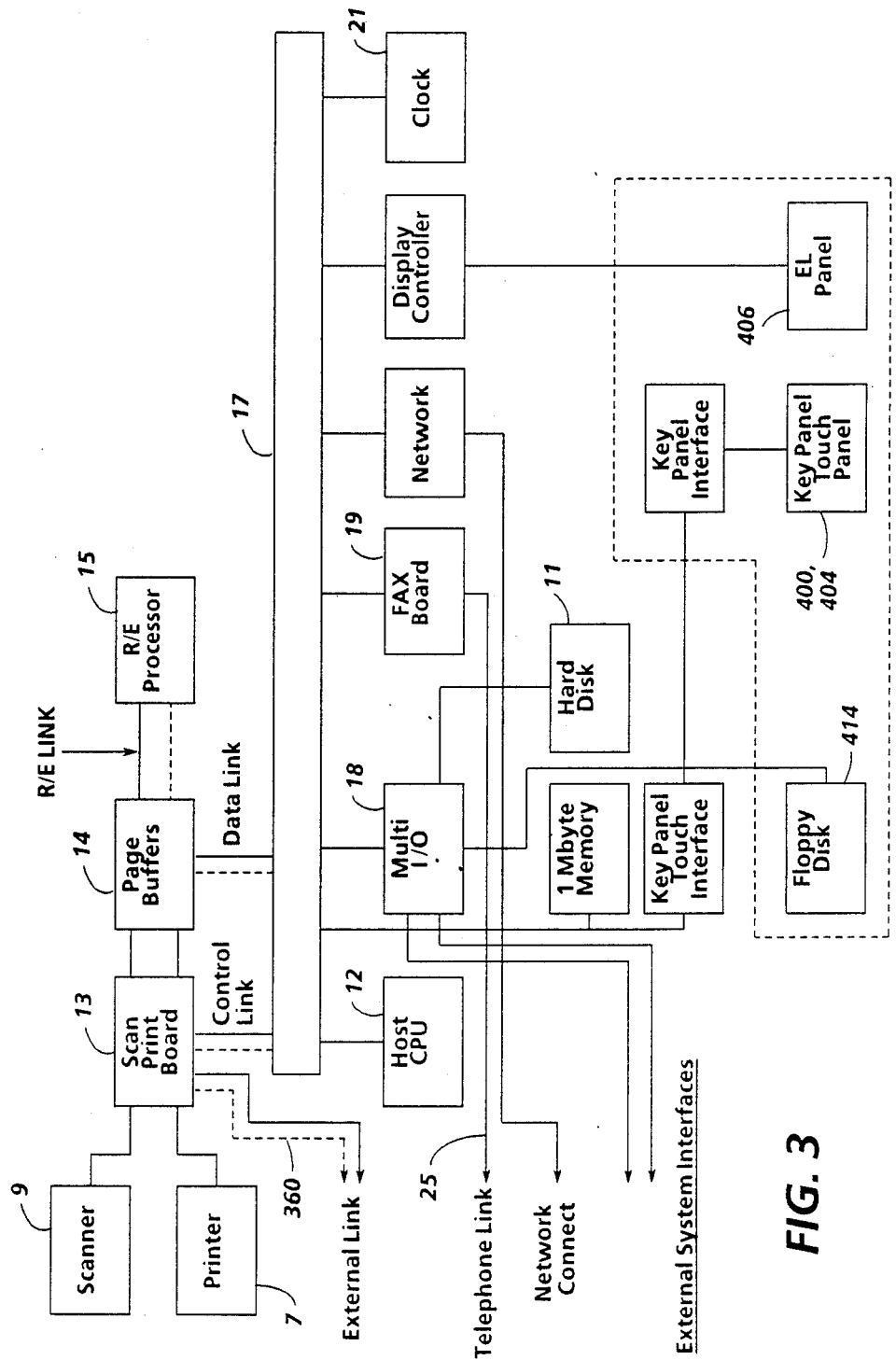
FIG. 3 is a block diagram showing the principal operating circuits for the machine shown in FIG. 1.

Referring now to FIGS. 1-4, there is shown by way of example a multi-function copier, printer, and facsimile machine, designated generally by the numeral 5, of the type adapted to incorporate the queue management system of the present invention. It will, however, be understood that the queue management system described herein may be used with other electrostatographic printer types and machines. Machine 5 has a laser printer 7 and document scanner 9 together with touch panel type User Interface (UI) 10 for controlling and programming machine operation. A hard disk 11 provides memory for storing machine control and image data, the latter being in the form of video image signals. The machine control system includes a host computer 12, a scan/print Printed Wiring Board (PWB) 13, page buffers 14, and Reduction/Enlargement (R/E) processor 15. A data channel 17, which provides a transmission path for control data and video image signals, is coupled to scan/print PWB 13 and page buffers 14. A multi-port I/O section 18 couples data channel 17 with UI 10 and provides coupling to other external system data sources as well as disk 11. A fax PWB 19, which couples data channel 17 with suitable communications links such as telephone line 25, enables facsimile transmission and reception. Machine 5 may be connected to serve as a printer when connection is established with a single workstation, multiple workstations, or a local area network.

Printer 7 includes a photoreceptor drum 20, the outer surface 22 of which is coated with a suitable photoconductive material, and a charge corotron 28 for charging the drum photoconductive surface 22 in preparation for imaging. Drum 20 is suitable journaled for rotation within the machine frame 35, drum 20 rotating in the direction indicated by the arrows to bring the photoconductive surface thereof past exposure, developer, and transfer stations 32, 34, 36 of the printer 7.

In the xerographic process practiced, the photoconductive surface 22 of drum 20 is initially uniformly charged by charge corotron 28, following which the charged photoconductive surface 22 is exposed by imaging beam 40 at exposure station 32 to create an electrostatic latent image on the photoconductive surface 22 of drum 20.

Figure 9:
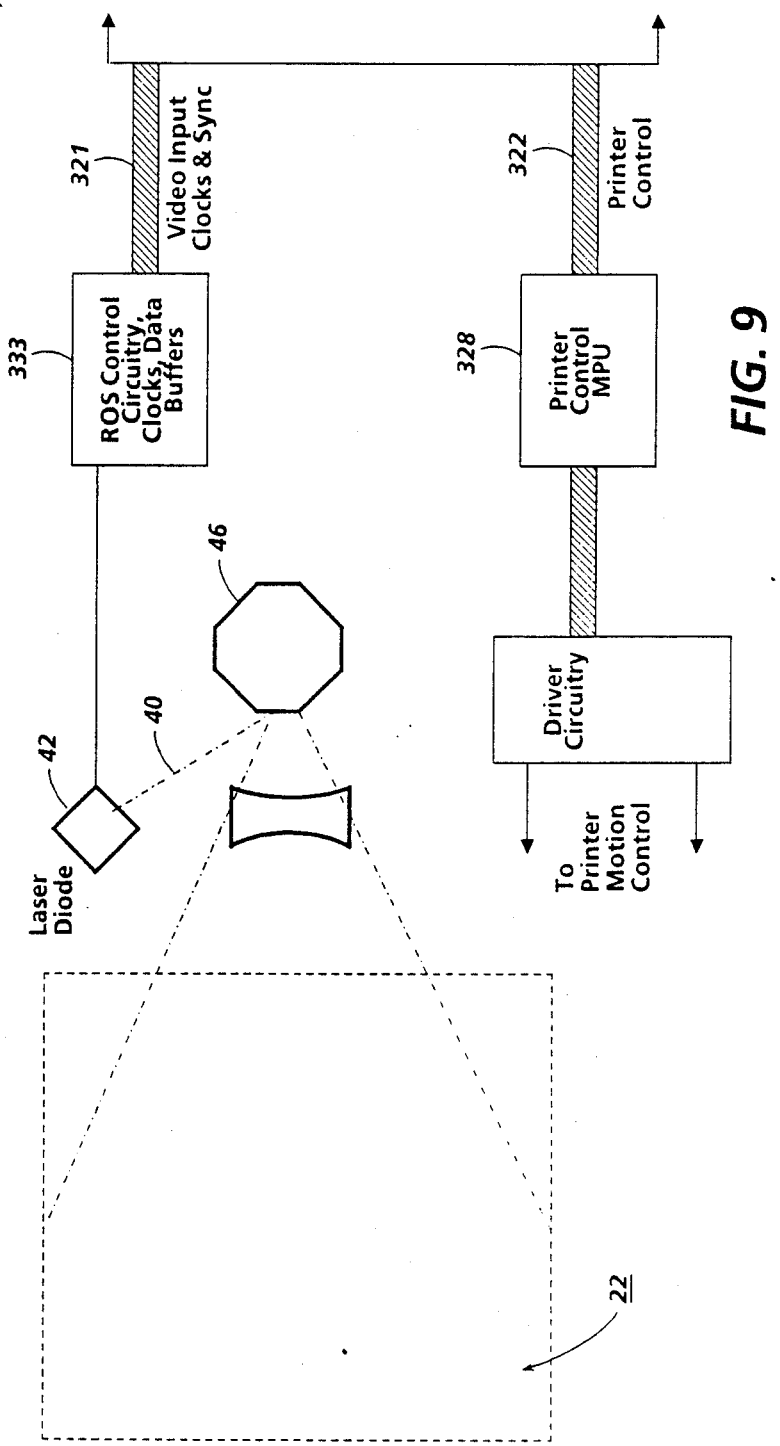
FIG. 9 is a block diagram showing details of the scan control circuitry for operating the printer.

Referring also to FIG. 9, imaging beam 40 is derived from a laser diode 42 modulated in accordance with video image signals from scan/print PWB 13. Image signals may be provided by scanner 9, disk 11, or from a suitable external source through multi-port I/O section 18, fax PWB 19, or any other suitable interconnection. The modulated imaging beam 40 output by laser diode 42 is impinged on the facets of a rotating multi-faceted faceted polygon 46 which sweeps the beam across the photoconductive surface 22 of drum 20 at exposure station 32.

Following exposure, the electrostatic latent image on the photoconductive surface 22 of drum 20 is developed at developer station 34 by a single component magnetic brush development system that includes a rotatable magnetic brush roll 50 in developing relation with the surface 22 of drum 20. Single component developer is supplied to magnetic brush roll 50 from a developer housing 52.

Prints or copies are produced on a suitable support material, such as copy sheets 68. A supply of copy sheets 68 is provided by paper trays 70, 72, 74, trays 70, 72, 74 each having a feed roll 76 for feeding one sheet at a time from the stack of sheets in the tray to a pinch roll pair 78 where the sheet is registered with the image developed on drum 20. Following registration, the sheet is forwarded to transfer station 36 where the developed image is transferred from photoconductive surface 22 to the copy sheet 68. Following transfer, the copy sheet bearing the toner image is separated from the photoconductive surface 22 of drum 20 and advanced to fixing station 80 wherein roll fuser 82 fuses or fixes the transferred powder image thereto. After fusing, the finished copy or print is advanced by print discharge rolls 84 to print output tray 86.

Any residual toner particles remaining on the photoconductive surface 22 of drum 20 after transfer is removed by a suitable cleaning mechanism (not shown).

Document scanner 9 is a dual mode scanner, permitting either manual scanning operation in which a document 110 to be scanned is manually placed upon a transparent platen 101 or automatic scanning in which one or more documents to be scanned are placed on inclined document feed tray 103. Scanner 9 has a CCD type contact array 102 disposed on a movable scan carriage 105. Carriage 105 is suitably supported for reciprocating back and forth scanning movement below platen 101, carriage 105 moving from a home or park position 107 adjacent one end of platen 101 to the opposite end and back. Lamps 111 on carriage 105 illuminate the document line being scanned. A hinged cover is provided to close platen 101 during manaul scanning and to cover and protect the platen when not in use.

For automatic scanning operating, scan carriage 105 is retained in the park position 107 and the document(s) to be scanned, which rest on inclined document feed tray 103, are transported one by one past array 102 by means of document feed rolls 113, 114, 115. Feed rolls 113, 114, 115 cooperate to form nips upstream and downstream of the scan point. The scanned document(s) are deposited onto a discharge tray 116 (seen in FIG. 1) for removal.

Figure 5:
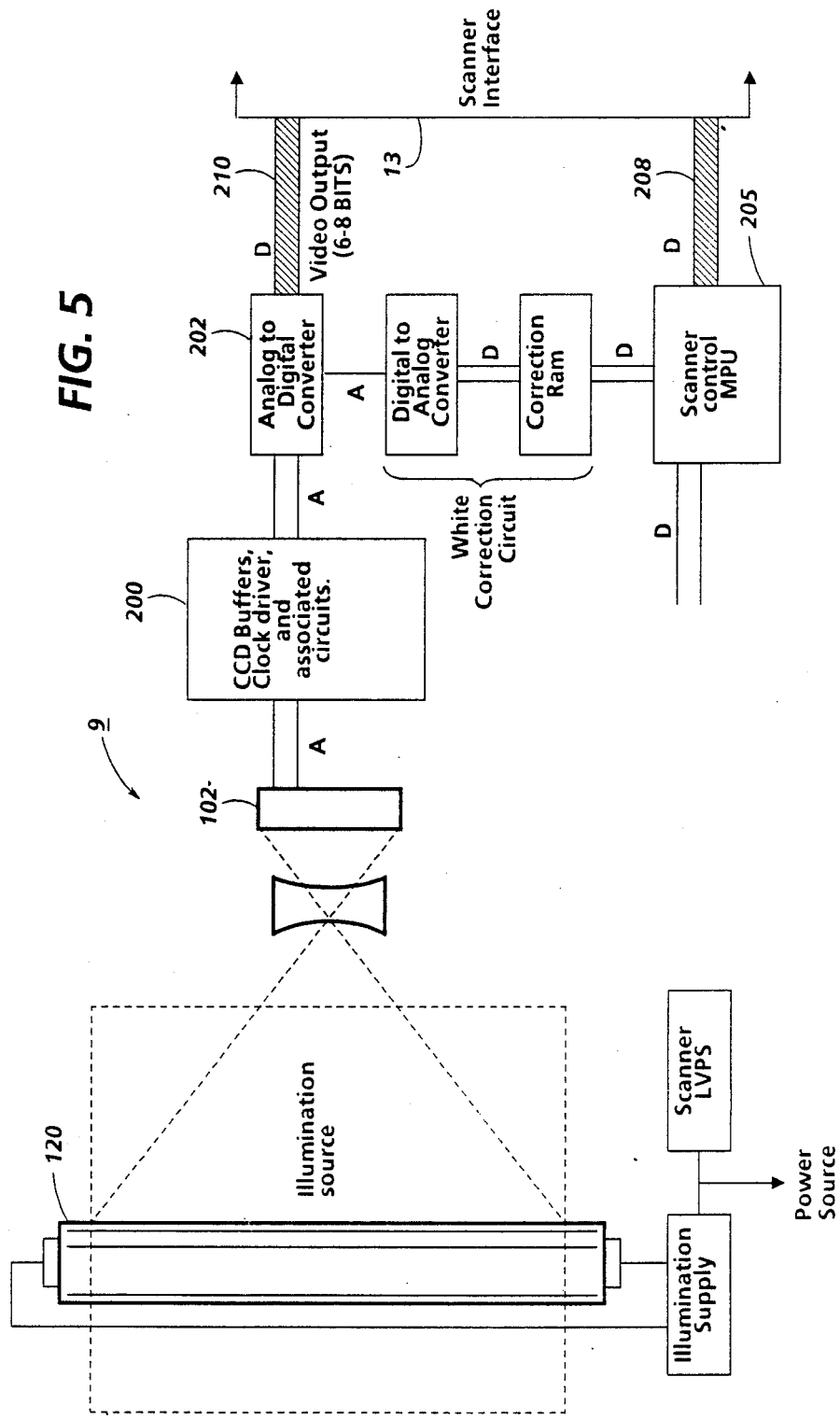
FIG. 5 is a block diagram showing details of the scan control circuitry for the document input scanner.

Referring to FIG. 5, the photo-electrical charge signals output by array 102 of scanner 9 are buffered by buffer 200 while the signals are processed following which the signals are converted to digital by A/D converter 202. Local control of scanner 9 is provided by a controller 205. Scanner 9 is interfaced with scan/print PWB 13 by communications port 208 and video output port 210, the latter carrying pixel clock, line sync, and page sync signals in addition to the video image data.

Figure 6:
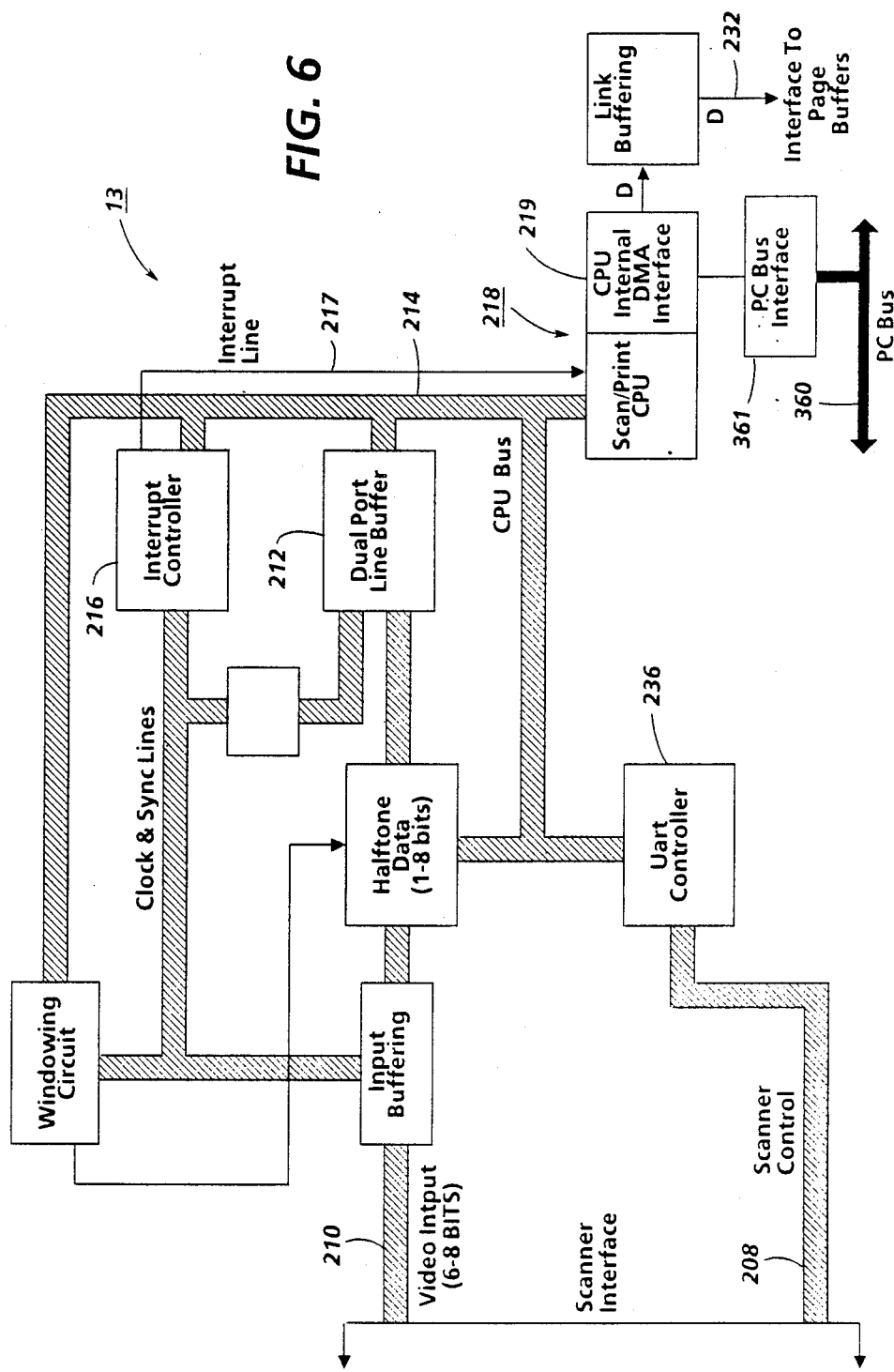
FIG. 6 is a block diagram of the circuitry for processing image signals output by the document input scanner.
Figure 7:
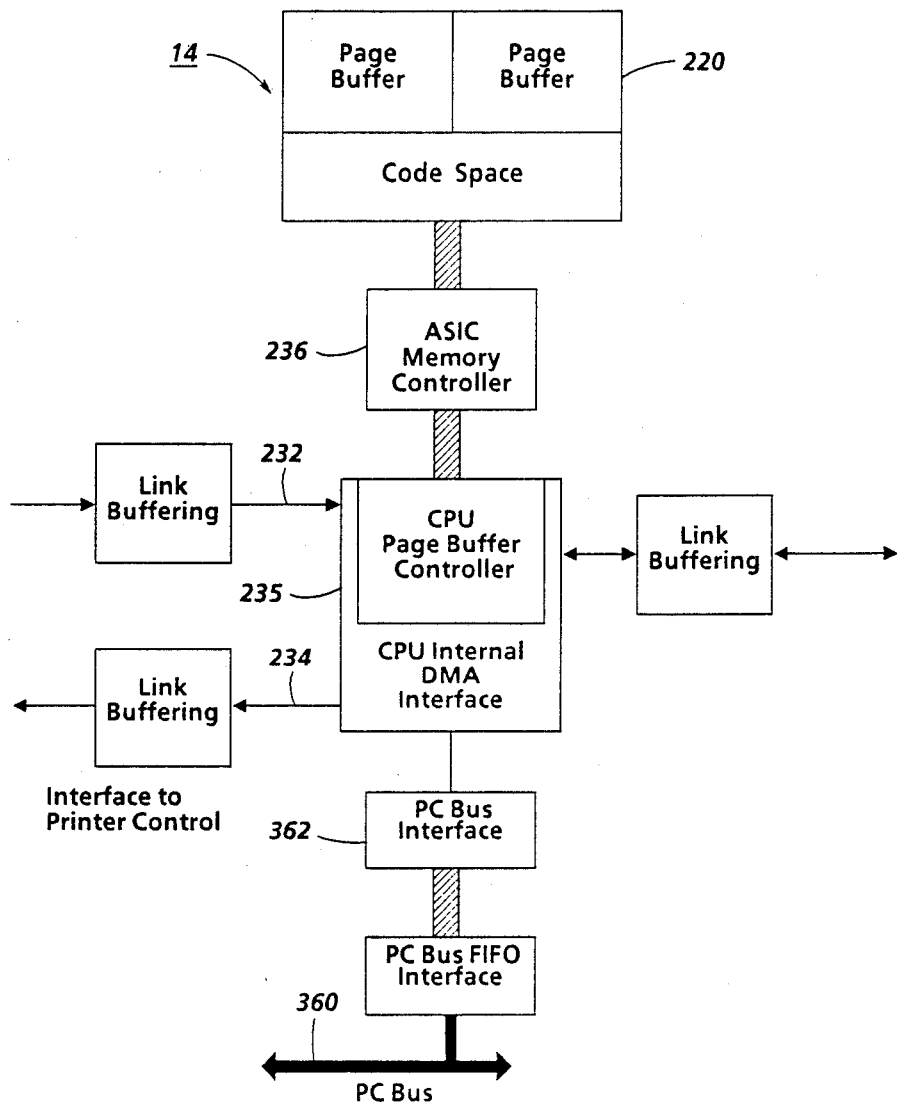
FIG. 7 is a block diagram of the page buffer circuitry for storing image signals.

Referring to FIGS. 6 and 7, the video image signals output by scanner 9 are stored in sequential order in one side of dual port line buffer 212 of scan/print PWB 13. A processor bus 214 is tied to the other side of buffer 212. As each image line from scanner 9 is completed, an interrupt controller 216 responds and outputs an interrupt signal via line 217 to the internal DMA interface 219 of a transputer 218 causing transputer 218 to read an image line out of buffer 212.

The image line is sent to a buffer 220 of page buffers 14 by a 'link' protocol built into transputer 218. The link protocol allows for automatic asynchronous transfer of large amounts of video data with no processor overhead. By using separate links 232, 234 under the control of page buffer controller 235, one for transferring image data from scanner 9 to page buffers 14 and the other for transferring image data from page buffer 14 through transputer 236 (see in FIG. 8) to printer 7, very high image data transfer rates are achieved, allowing both printer 7 and scanner 9 to operate at the same time. Further, the asynchronous nature of links 232, 234 allows printer 7 and scanner 9 to run at different speeds and image sizes.

Figure 8:
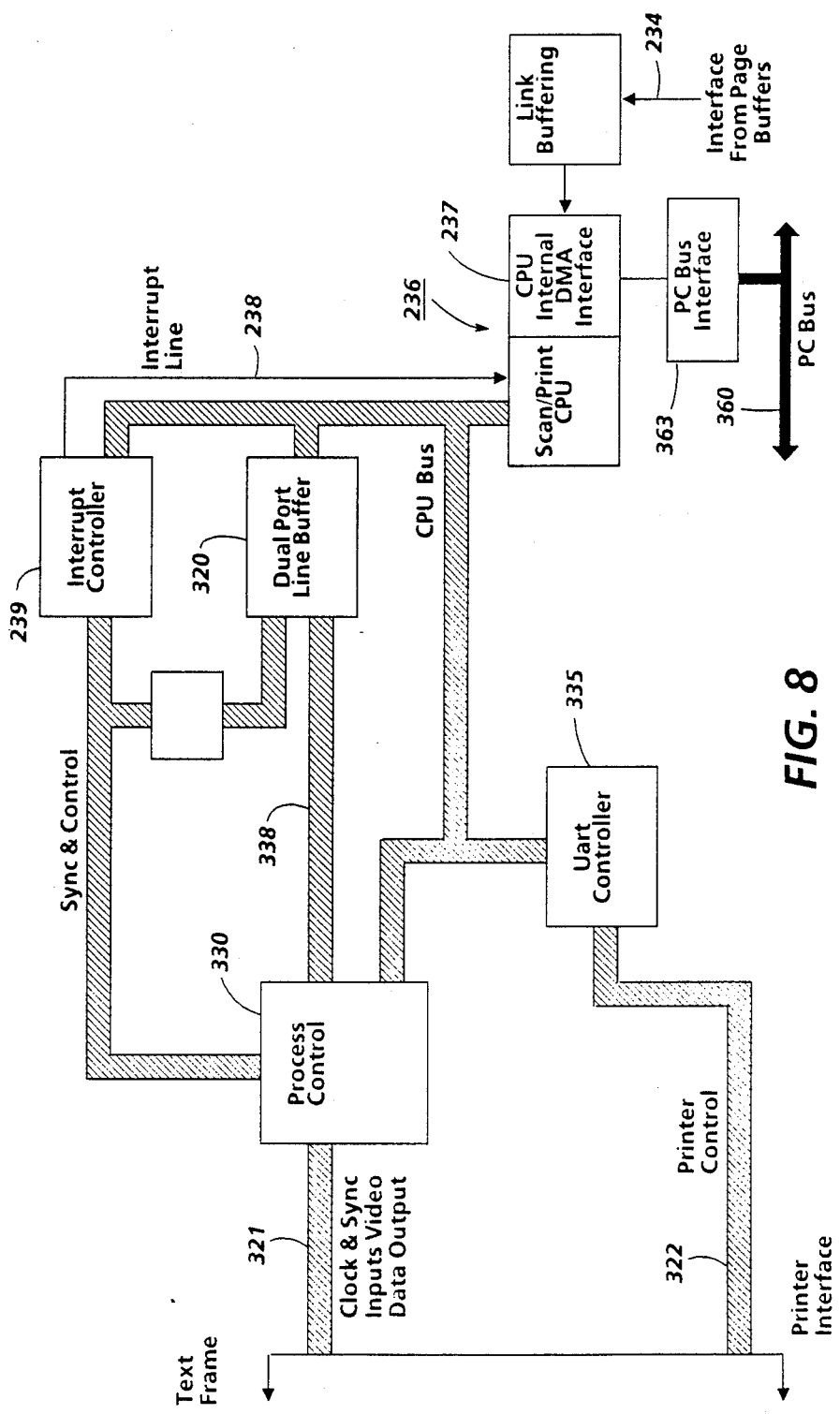
FIG. 8 is a block diagram of the circuitry for processing image signals for printing by the printer.

Referring to FIGS. 7-9, image data is output to printer 7 from page buffers 14 over link 234 in substantially the same manner as image data is received from scanner 9. On a request for a page, printer 7 cycles up and provides pixel clock, line sync, and page sync signals. During each line sync signal, transputer 236 programs internal DMA interface 237 in response to an interrupt signal from interrupt controller 239 through interrupt line 238 to read out a specific number of image signal bytes from page buffers 14 into one side of dual port line buffer 320. From buffer 320, the image signals are input to the process control 330 of the present invention where the image gray level is adjusted.

The processed video image signals output by control 330 together with pixel clock, line sync, and page sync signals are transmitted to printer 7 through video output port 321 and control circuit 333 to diode 42. Control information for printer 7 is transmitted to the printer control 328 from controller 335 via a communications port 322. Printer control 328 controls all paper handling, xerographic, and video control functions of printer 7. In addition, diagnostics and component control functions can be accessed. Once a page is requested, printer 7 cycles up and provides pixel clock, line sync, and page sync as outputs for synchronizing the video image signals sent to laser 42 for imaging onto drum 20.

As seen in FIGS. 6–8, transputers 218, 236 and page buffer 220 may be interfaced with an external data source or printer such as a Personal Computer (PC) through a bus 360 and bus interfaces 361, 362, 363. Interrupt controllers 216, 239 of scan print PWB 13 allow transputers 218, 236 to respond to real time event requests (line sync, scan sync, page sync, communications, etc.) from the outside source. Each interrupt is maskable in hardware to lock out either the scanner or printer interrupts.

Figure 10:
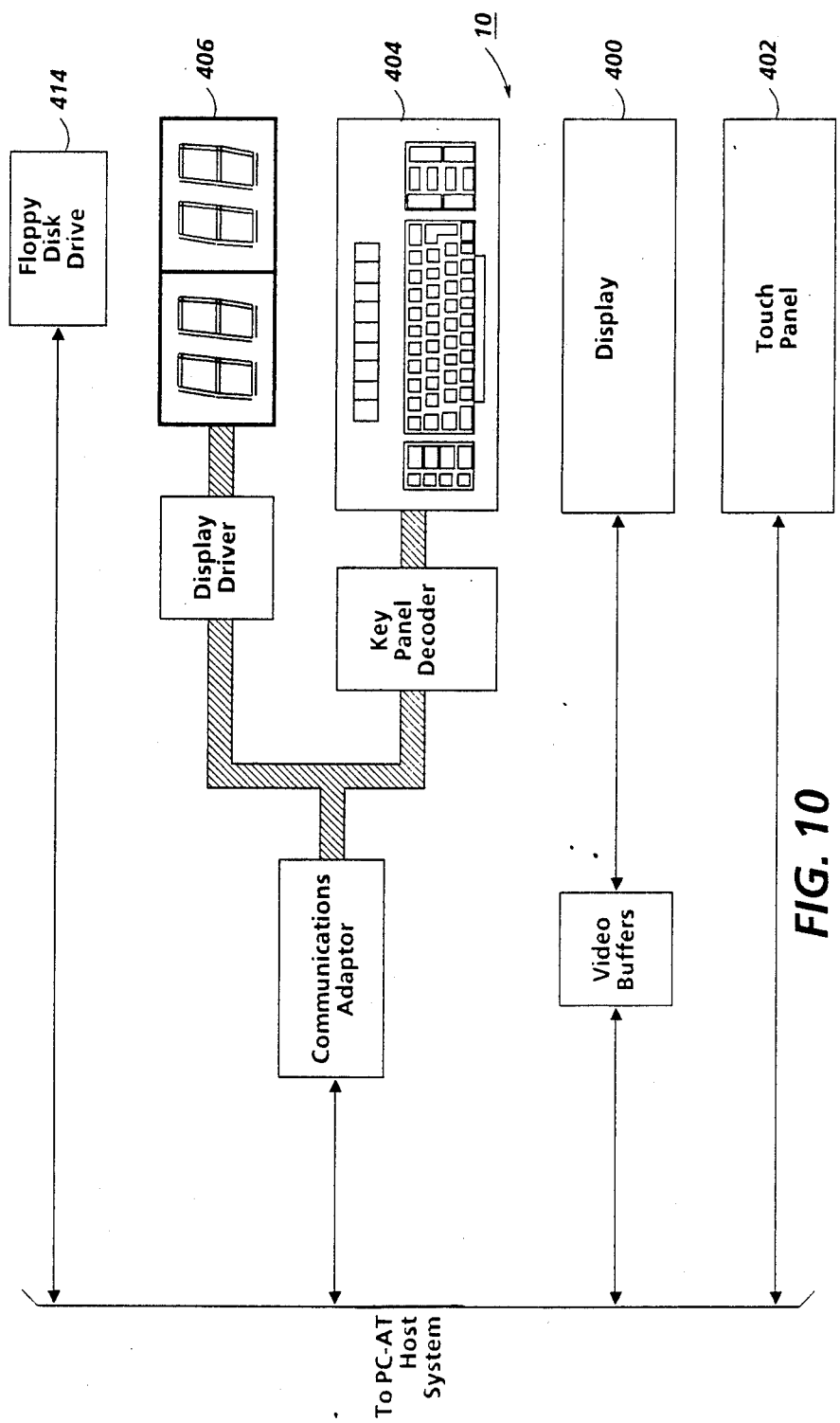
FIG. 10 is a block diagram showing the principal components of the User Interface for the machine shown in FIG. 1.

Referring to FIG. 10, UI 10 includes a display 400 with pressure type touch panel overlay 402. Display 400 displays operator selections and machine operating data in the form of icons or pictograms and alpha numeric characters. These provide various operator selections for programming the machine 5 and informational messages and instructions such as identifying machine faults, providing diagnosis instructions, etc. Additionally, a key panel 404 and LED display 406 are provided. Additional control and informational displays and/or other display types may be contemplated.

To enable software programs to be written to or read from hard disk 11 through the mechanism of floppy disks, a suitable floppy disk drive 414 with suitable R/W head is provided. By using floppy disks, users can input print jobs directly rather than by a network. Additionally system software updates, fonts, and custom drivers etc. may also be loaded by the floppy disks.

Figure 11:
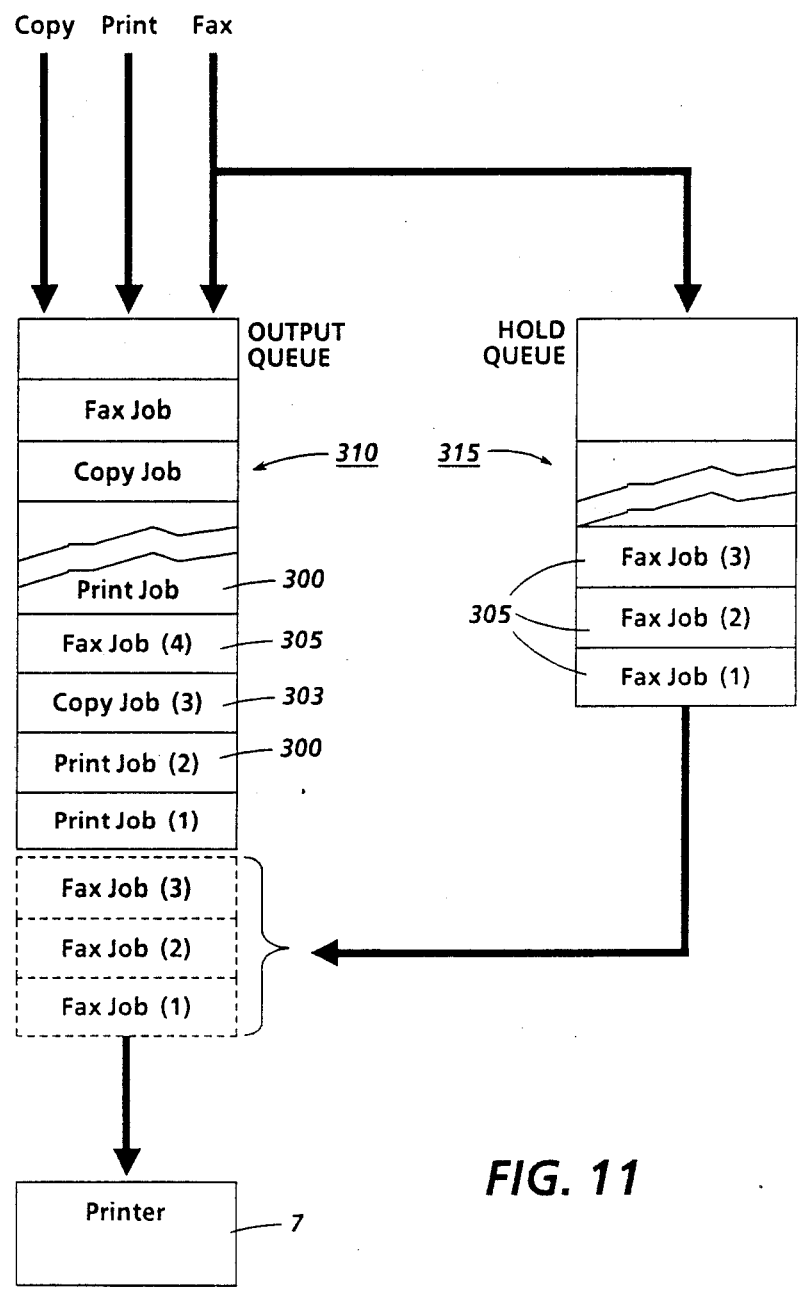
FIG. 11 is a schematic diagram showing details of the job output and hold queues of the present invention.
Figure 12:
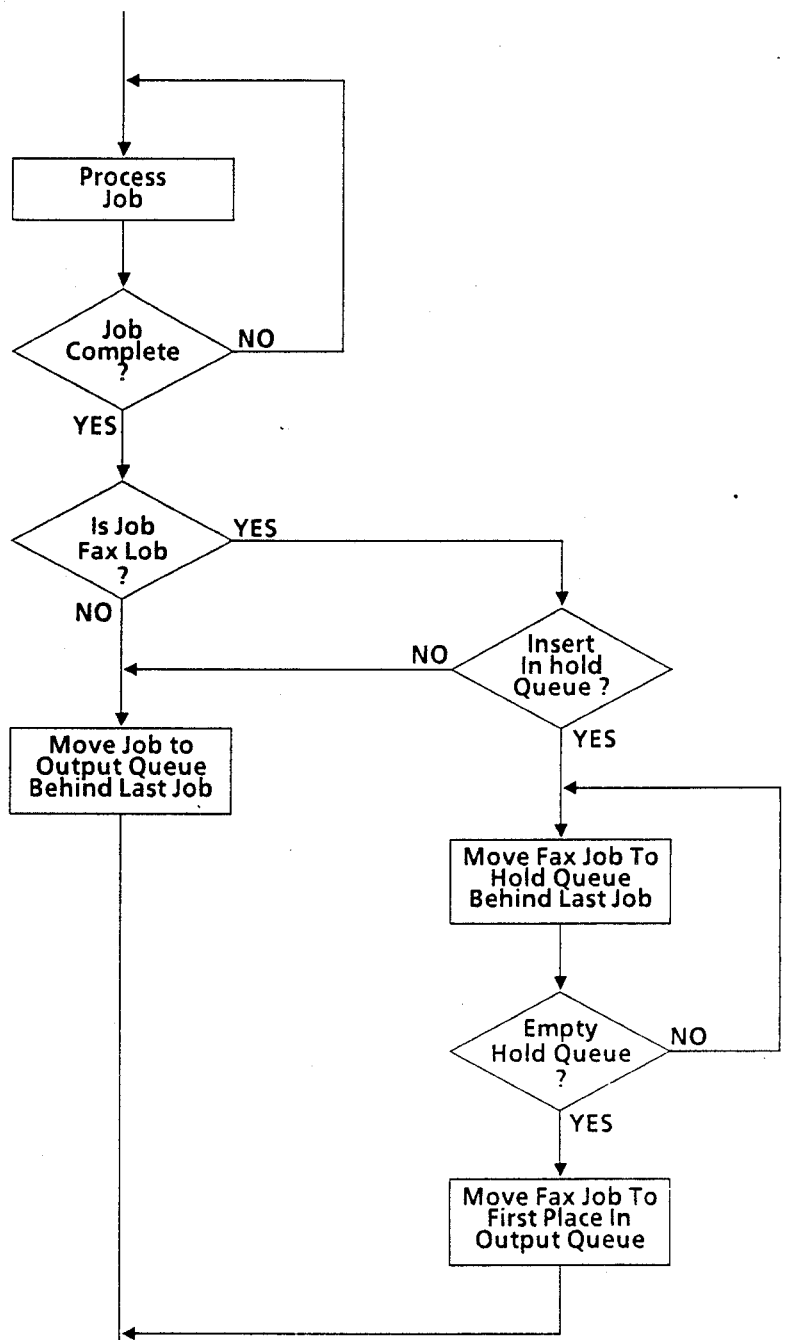
FIG. 12 is a flow chart depicting the copy, print, and fax job queue management process of the present invention.

Referring to FIGS. 11 and 12, to manage the printing of jobs by machine 5, the queue management system of the present invention is provided. Jobs to be printed consist of any one of several different types of jobs such as print jobs 300 in which prints are made from image data received from image generating devices such as a personal computer, copy jobs 303 in which copies are made of documents 110 scanned by scanner 9, facsimile (fax) jobs 305 in which copies and prints are made from video information transmitted to machine 5 via a communication channel such as telephone line 25 (see in FIG. 3), etc.

The queue management system provides a plurality of operating modes, a first mode consisting of an Automatic Fax Release Mode in which the print, copy, and fax jobs 300, 303, 305 are held in a job printing or output queue 310 for printing in order in which the jobs are received (i.e., FIFO). A second mode, the Hold Fax Mode, allows only print and copy jobs 300, 303 to be transferred to output queue 310 for printing in the order in which received while fax jobs 305 are placed in a holding queue 315 and not printed. A third mode, the Released Fax Mode, releases the fax jobs(s) 305 for holding queue 315 for transfer to output queue 305 for printing. In the Released Fax Mode, the fax jobs 305 released from holding queue 310 are inserted into output queue 310 ahead of any print or copy jobs 300, 303 currently pending in output queue 310 for intermediate printing (i.e., LIFO). If several fax jobs 305 are in holding queue 315 at the time of release, the entire block of fax jobs are inserted into output queue 310 ahead of the next print or copy job scheduled to be printed. In that case, the released fax jobs are printed in the order in which the fax jobs were in at the time of release. Alternately, fax jobs may be released individually in which case the released fax jobs are individually inserted into the output queue 310 ahead of the next print or copy job scheduled to be printed.

Print, copy, and fax jobs 300, 303, 305 may be moved into output queue 310 at any time. Print, copy, and fax jobs 300, 303, 305 in either holding or output queue 310 or 315 may be deleted at the option of the user at any time. Where the job is deleted while the job is in the process of being printed, all copies or prints in paper path of printer 7 are sent to output tray 86 and all further printing of the job is stopped and the job is deleted.

Each job 300, 303, 305 is listed on one line of the display 400 of UI 10. To identify the jobs, each line (and hence each job) may be numbered. Further, the job parameters of the individual jobs such as number of copies or prints to be made, paper tray selection, etc. may be changed up to the time the job is scheduled for printing. And, UI 10 may be programmed to allow jobs already in output queue 310 to be repositioned within the queue.

Jobs in holding queue 315 remain there until the job is explicitly released. All jobs in the holding queue are released at once when the release function is invoked. Holding queue 315 is a FIFO queue, listing the jobs in the order in which they are received. When holding queue 315 becomes filled, the fax jobs are automatically moved from holding queue 315 into output queue 310 to free up space in the holding queue for additional jobs. If a second group of fax jobs 305 is released while printer 7 is printing a group of previously released fax jobs, the newly released fax jobs will be printed immediately after printing of the first group of fax jobs is completed.

While automatic moving of fax jobs from holding queue 315 in the event that queue 315 becomes filled is described, it will be understood that in the event queue 315 is filled, a warning message may be displayed on display 400 of UI 10 to alert the operator to this condition. The operator may, by using UI 10, move some or all of the fax jobs in holding queue 315 to output queue 310.

While the invention has been described with reference to the structure disclosed, it is not confined to the details set forth, but is intended to cover such modifications or changes as may come within the scope of the following claims.

We claim:

1. An queue management process for a multi-mode machine having copying, printing, and facsimile transmission and reception modes for processing copy, print, and facsimile jobs, said machine including a printer for making prints in response to a demand for copies, prints, and prints of facsimile transmissions; a job printing queue, and a job holding queue, comprising the steps of:

(a) in one machine mode, inserting all copy, print, and facsimile jobs in said printing queue with said jobs being arranged for printing by said printer in said printing queue in the order in which said jobs are received; and (b) in a second operating mode (1) inserting all copy and print jobs in said printing queue with said jobs being arranged for printing by said printer in said printing queue in the order in which said jobs are received;

(2) inserting all facsimile jobs not to be printed in said job holding queue with said facsimile jobs being arranged in said holding queue in order in which said facsimile jobs are received;

(3) transferring at least one of said facsimile jobs from said holding queue to said printing queue;

(4) interrupting the printing order of any of said copy and print jobs currently in said printing queue and placing said one facsimile job transferred from said job holding queue ahead of any of said copy and print jobs in said printing queue whereby said one facsimile job is printed first; and (5) following printing of said one facsimile job, resuming printing ot the next one of said copy and print jobs remaining in said printing queue.

2. The system according to claim 1 including the step of:

where multiple facsimile jobs are transferred from said holding queue to said printing queue, placing said multiple facsimile jobs ahead of the next copy or print job to be printed in said printing queue, with said facsimile jobs being retained in the same order as the order in which said facsimile jobs were in before transfer from said holding queue.

3. The system according to claim 1 including the step of:

completing printing of any copy or print job in process before starting printing of said one facsimile job from said holding queue.

4. The system according to claim 1 including the step of:

transferring all of said fax jobs to said output queue in the event said holding queue is filled.

5. The system according to claim 1 including the step of:

displaying a warning message in response to said holding queue being filled.

6. A queue management process for a multi-mode machine having copying, printing, and facsimile transmission and reception modes for processing copy, print, and facsimile jobs, said machine including a printer for making prints in response to a demand for copies, prints, and prints of facsimile transmissions; a job printing queue, and a job holding queue, comprising the steps of:

(a) arranging said copy and print jobs in said printing queue in a first in-first out printing order;

(b) placing said facsimile jobs in said holding queue in a first in-first out order;

(c) where printing of at least one of said facsimile jobs in said holding queue is desired, moving said one facsimile job from said holding queue to said printing queue; and (d) intervening said first in-first out printing order for copy and/or print jobs in said printing queue by placing said one facsimile job from said holding queue ahead of the next copy or print job to be printed in said printing queue so that said facsimile job is printed before the next copy or print job.

7. The process according to claim 6 including the step of:

where said holding queue is filled, transferring at least one of said facsimile jobs from said holding queue to said printing queue.

8. The process according to claim 6 including the step of:

where plural facsimile jobs are moved from said holding queue to said printing queue for printing by said printer, intervening in said first in-first out printing order for copy and/or print jobs by placing said plural facsimile jobs ahead of the next copy or print job to be printed in said printing queue so that said plural facsimile jobs are printed before the next copy or print job.

9. The process according to claim 8 including the step of:

retaining said first in-first out order of said plural facsimile jobs in said holding queue on transfer of said plural facsimile jobs from said holding queue to said printing queue.

* * * * *